(12) United States Patent  
Vachris et al.

(10) Patent No.: US 6,856,383 B1
(45) Date of Patent: Feb. 15, 2005

(54) RELIEF OBJECT IMAGE GENERATOR

(75) Inventors: Paul F. Vachris, Palm Bay, FL (US); Ronald S. Smith, Palm Bay, FL (US)

(73) Assignee: Security First Corp., Rancho Santa Margarita, CA (US)

( * ) Notice: Subject to any disclaimer, the term of this patent is extended or adjusted under 35 U.S.C. 154(b) by 53 days.

(21) Appl. No.: 08/926,277

(22) Filed: Sep. 5, 1997

(51) Int. Cl.[7] ................................................. G06K 9/20
(52) U.S. Cl. ........................................................ 356/71
(58) Field of Search .................. 356/71; 382/124–127; 345/175

(56) References Cited

U.S. PATENT DOCUMENTS

| | | | |
|---|---|---|---|
| 3,663,194 A | | 5/1972 | Greenstein et al. |
| 3,875,449 A | | 4/1975 | Byler et al. |
| 3,944,978 A | | 3/1976 | Jensen et al. |
| 4,297,619 A | | 10/1981 | Kiteley |
| 4,322,163 A | | 3/1982 | Schiller |
| 4,340,300 A | | 7/1982 | Ruell |
| 4,358,677 A | | 11/1982 | Ruell et al. |
| 4,385,831 A | | 5/1983 | Ruell |
| 4,414,684 A | | 11/1983 | Blonder |
| 4,428,670 A | | 1/1984 | Ruell et al. |
| 4,548,646 A | | 10/1985 | Mosser et al. |
| 4,569,080 A | | 2/1986 | Schiller |
| 4,624,798 A | * | 11/1986 | Gindrup et al. .......... 252/62.54 |
| 4,684,353 A | | 8/1987 | deSouza |
| 4,720,432 A | | 1/1988 | VanSlyke et al. |

(List continued on next page.)

FOREIGN PATENT DOCUMENTS

| | | |
|---|---|---|
| EP | 0 345 368 | 12/1989 |
| EP | 0 455 401 | 6/1991 |

(List continued on next page.)

OTHER PUBLICATIONS

Patent Abstracts of Japan—Publication No. 02126381, Publication Date: May 15, 1990.

(List continued on next page.)

*Primary Examiner*—Richard A. Rosenberger
(74) *Attorney, Agent, or Firm*—Randall L. Reed; Levin & O'Connor

(57) ABSTRACT

A device for imaging a relief object without illuminating a platen is disclosed. The device includes a single electrode electroluminescent device, which may be inorganic or organic, and a current source. The current source is coupled to the single electrode of the electroluminescent device and to the relief object to be imaged. The valleys and ridges of the relief object couple current to the electroluminescent device at different magnitudes which causes the electroluminescent device to generate light at different intensities that correspond to the ridges and valleys of the relief object. The generated light forms an image of the relief object which may be focused by optical elements onto a sensor array for capture and image processing. In another embodiment of the invention, a one-to-one sensor array is located proximate the electroluminescent device to capture the image. In an embodiment of the invention which insulates the relief object from current, the electroluminescent device is covered with a variable resistance layer and the variable resistance layer is covered with a flexible electrode. One lead from the current source is coupled to the flexible electrode and another lead is coupled to the single electrode. When a relief object is brought in contact with the flexible electrode, a localized pressures generated by the ridges of the relief object form conductive paths through the variable resistance layer which are lower in electrical resistance than those formed by pressure in the areas adjacent the valleys of the relief object. The different magnitudes of current delivered through the conductive paths to the electroluminescent device cause the electroluminescent device to generate an image of the relief object without exposing the relief object to electrical current.

31 Claims, 1 Drawing Sheet

U.S. PATENT DOCUMENTS

| | | |
|---|---|---|
| 4,816,717 A | 3/1989 | Harper et al. |
| 4,827,527 A | 5/1989 | Morita et al. |
| 4,853,079 A | 8/1989 | Simopoulos et al. |
| 4,853,594 A | 8/1989 | Thomas |
| 4,999,936 A | 3/1991 | Calamia et al. |
| 5,079,483 A | 1/1992 | Sato |
| 5,096,290 A | 3/1992 | Ohta |
| 5,177,353 A | 1/1993 | Schiller |
| 5,189,482 A | 2/1993 | Yang |
| 5,209,967 A * | 5/1993 | Wright et al. ............ 428/317.9 |
| 5,210,588 A | 5/1993 | Lee |
| 5,222,153 A | 6/1993 | Beiswenger |
| 5,243,060 A | 9/1993 | Barton et al. |
| 5,398,275 A | 3/1995 | Catalin |
| 5,420,936 A | 5/1995 | Fitzpatrick et al. |
| 5,426,708 A | 6/1995 | Hamada et al. |
| 5,446,290 A | 8/1995 | Fujieda et al. |
| 5,467,403 A | 11/1995 | Fishbine et al. |
| 5,491,377 A | 2/1996 | Janusauskas |
| 5,493,621 A | 2/1996 | Matsumura |
| 5,519,785 A | 5/1996 | Hara |
| 5,526,436 A | 6/1996 | Sekiya |
| 5,546,462 A | 8/1996 | Indeck et al. |
| 5,548,394 A | 8/1996 | Giles et al. |
| 5,598,485 A | 1/1997 | Kobayashi et al. |
| 5,613,014 A | 3/1997 | Eshera et al. |
| 5,623,552 A | 4/1997 | Lane |
| 5,623,553 A | 4/1997 | Sekiya |
| 5,629,764 A | 5/1997 | Bahuguna et al. |
| 5,633,947 A | 5/1997 | Sibbald |
| 5,635,723 A | 6/1997 | Fujieda et al. |
| 5,680,205 A | 10/1997 | Borza |
| 5,732,148 A | 3/1998 | Keagy et al. |
| 5,781,651 A * | 7/1998 | Hsiao et al. ................ 382/127 |

FOREIGN PATENT DOCUMENTS

| | | |
|---|---|---|
| EP | 0455401 A2 | 11/1991 |
| EP | 0 756 334 | 1/1997 |
| EP | 0756334 A2 | 1/1997 |
| WO | 97/16834 | 5/1997 |
| WO | WO 97/16834 | 6/1997 |

OTHER PUBLICATIONS

Database WPI—Jul. 15, 1982—Abstract Page.

Database WPI—Jan. 28, 1981—Abstract Page.

Copy of co–pending U.S. Appl. No. 08/883,154 filed Jun. 27, 1997.

Copy of co–pending U.S. Appl. No. 09/401,480 filed Sep. 22, 1999.

* cited by examiner

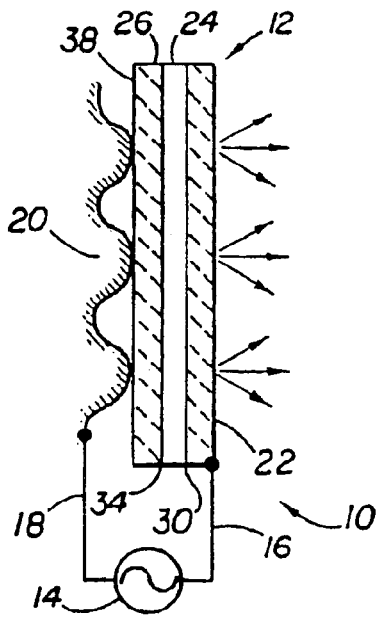
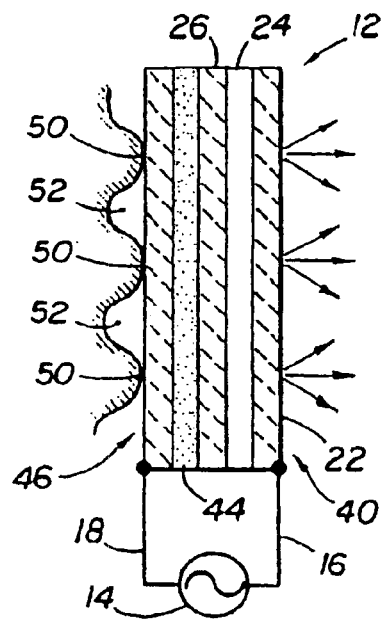
FIG 1     FIG 2
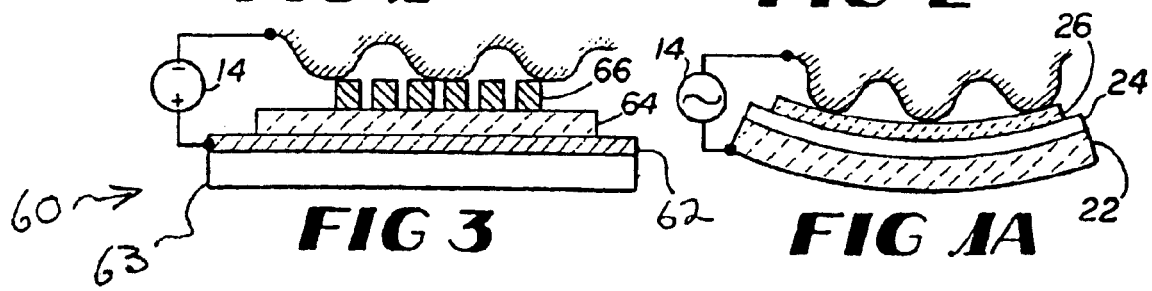
FIG 3     FIG 1A
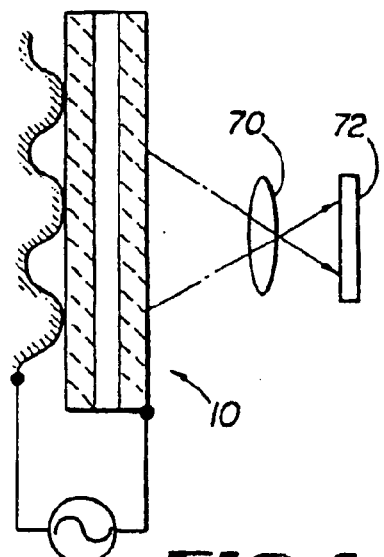
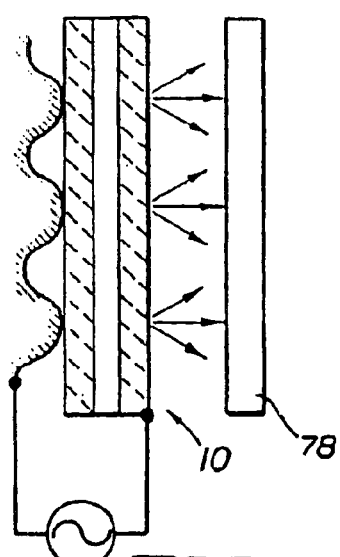
FIG 4     FIG 5

RELIEF OBJECT IMAGE GENERATOR

FIELD OF THE INVENTION

This invention relates to image generation, and more particularly, to image generation of relief objects.

BACKGROUND OF THE INVENTION

Systems for generating images of relief objects are known. Relief objects are objects having a surface with features typically formed by ridges and valleys. A common relief object imaged by known technology is a fingerprint. These known systems include a platen to which a relief object is pressed to expose the ridges and valleys of the relief object to imaging equipment. The platen is illuminated by a light source. In many relief object imaging systems, the light from the light source is passed through a collimator before it illuminates the platen. The light is typically coupled through a right-angle prism to the platen at or near an angle corresponding to Total Internal Reflection (TIR). TIR refers to the frustration or absorption of light at the ridges of the relief object and its reflection back through the platen at the valleys of the relief object. Thus, light from the light source is modulated by the structural features of the relief object pressed against the platen and this modulated light is transmitted through the platen to an optical system. The optical system is usually comprised of lenses and other optical treating components. The optically treated, modulated light then impinges on a sensor array which converts the optical energy into electrical energy. The intensity at each element of the sensor array is typically converted to a digital value and the values for the array elements may then be processed by a computer for classification or verification of the relief object.

These known relief object imaging systems have a number of disadvantages. For one, each requires a light generating source which must be located at a distance from the platen so that a substantial portion of the platen surface is illuminated by the light source. Additionally, the optically treating elements are typically placed at a distance and angle from the platen to receive the reflected light from the platen. To optimize the benefits of the optical element processing, the optical treating elements must be located at distances from the platen where light rays converge or other known optical physical phenomenon occur. Thus, the geometry of known relief object imaging systems impose size constraints which limit the applications for known relief object imaging systems.

Another disadvantage of known imaging systems are distortions of the reflected image. For example, the platen and sensor array in a typical relief object imaging system are tilted to maintain good focus while also maintaining platen illumination near the TIR angle. This tilting causes two types of distortions known as a keystone distortion and cosine distortion. Frequently, these distortions are reduced by interposing optical elements between the sensor array and the platen. However, the interposing of additional optical treating elements exacerbates the geometric constraints for the system and further impacts the applications in which the system may be used.

Known relief object image generating systems are also sensitive to ambient light entering the platen from the surface on which the relief object is placed. Additionally, the presence of an excessive amount of moisture or oil on the relief object alters the modulation of the light by the relief object and may further degrade the image of the relief object in such systems. Likewise, an exaggerated absence of moisture and other fluids in a relief object, such as a fingerprint, may also alter the light modulation produced by the relief object and degrade the image of the relief object. Also, systems which are engineered to address image degradation caused by excessive moisture may not adequately correct degradations caused by excessively dry relief objects and vice versa.

What is needed is a relief object imaging system that reduces the geometrical constraints on the size of a relief object image generator.

What is needed is a relief object imaging system that reduces distortions in an image of the relief object.

What is needed is a relief object image generating system that reduces degradation caused by excessive moisture without increasing the likelihood of degradation caused by exaggerated absence of moisture.

SUMMARY OF THE INVENTION

The above identified limitations and disadvantages of previously known relief object image generating systems are overcome by a system made in accordance with the principles of the present invention. The relief object imager of the present invention includes a single electrode electroluminescent device and an electrical current source, the electrical current source having one lead coupled to the single electrode of the electroluminescent device and a second lead for coupling to a relief object in proximity to the electroluminescent device. This system provides current to the relief object and the current is strongly coupled from the relief object to the single electrode electroluminescent device by ridges of the relief object while the current is weakly coupled to the electroluminescent device by the valleys of the relief object. Those areas of the electroluminescent device which are strongly coupled to the current from the relief object generate light which is more intense than the areas of the electroluminescent device which are weakly coupled to the current from the relief object. The light generated by the electroluminescent device in correspondence with the valleys and ridges of the relief object forms an optical image of the relief object. The single electrode electroluminescent device refers to a known two electrode electroluminescent device from which one electrode has been removed. The electrode in such devices are typically planar and are used to provide a light field that corresponds to the aligned areas of the electrodes. By removing an electrode and coupling the current source to a relief object held against the single electrode electroluminescent device, the amount of current coupled to different areas of the electroluminescent device varies in correspondence with the valleys and ridges of the relief object and generates an image of the relief object.

In one embodiment of the present invention, the single electrode electroluminescent device is an organic electroluminescent device and, in another embodiment, the single electrode electroluminescent device is an inorganic electroluminescent device. Both electroluminescent devices have an electrode removed so the ridges and valleys of the relief object may couple current to the electroluminescent device. Preferably, direct current (DC) sources are used with organic electroluminescent devices and alternating current (AC) sources are used with inorganic electroluminescent devices.

The optical image generated by the system of the present invention may be processed by optical elements and provided to a sensor array. Typically, the optical elements include reduction lenses which reduce the size of the image and, correspondingly, the size of the sensor array used to convert the image to electrical signals. Sensor arrays used in these embodiments of the present invention may be integrated circuits or the like. Using reduction lenses to reduce the size of the image, and correspondingly, the integrated circuit sensor, saves cost as the integrated circuit is made of silicon which has a cost directly proportional to the size of the integrated circuit. In another embodiment of the present invention, a one-to-one sensor array is located proximate to the single electrode electroluminescent device. The one-to-one sensor array has a length and width which is approximately the same as the electroluminescent device. The one-to-one sensor array may be made of amorphous silicon on glass. Because the sensor array is proximate to the electroluminescent device, the thickness of the relief object generator of the present invention is substantially smaller than previously known systems that require an optical element to focus light reflected from a platen onto a sensor array. Additionally, the sensor array and electroluminescent device are substantially orthogonal to the path of the light generated by the electroluminescent device. As a result, distortion caused by angular placement of the platen and sensor array in previously known systems is essentially eliminated.

In an embodiment of the present invention which uses an inorganic single electrode electroluminescent device, the electroluminescent device includes a transparent electrode layer, a dielectric layer, a light emitting layer which is interposed between a first surface of the transparent electrode layer and a first surface of the dielectric layer, and an alternating current source which has a first lead coupled to the transparent electrode layer and a second lead that is proximate to a second surface of the dielectric layer. When a relief object is placed in contact with the second surface of the dielectric layer and is coupled to the second lead of the alternating current source, current is strongly coupled from the ridges of the relief object through the dielectric layer and light emitting layer to the transparent electrode while current is weakly coupled from the valleys of the relief object to the transparent electrode. The light emitting particles in the strongly coupled current path generate light more intensely than those particles in the weakly coupled current path.

The system of the present invention does not require an external light source or for a collimator as no light is required for platen illumination. Instead, a relief object causes the single electrode electroluminescent device of the present invention to generate a self-luminous optical image of the relief object when the relief object is coupled to the current source and brought in contact with the single electrode electroluminescent device. Because the light is generated by the structure and not illuminated by a light source, the sensor may be placed directly opposite the transparent electrode of the electroluminescent device. No intervening optical elements are required for treating the light to reduce distortion caused by the angles at which the light source, platen and sensor array are located in previously known systems. As a result, the inventive relief object imaging system of the present invention is much more compact and may be used in many more applications then previously known imaging systems. For example, an embodiment of the present invention may be located on a keyboard of a laptop computer to generate an image of a fingerprint which may be compared to a stored image to provide access to the computer or converted to digital information and transmitted to another computer for access to another computer system to verify a financial transaction over a network.

In one aspect of the present invention, the light emitting layer of the inorganic type of electroluminescent device may include phosphor particles which may be a coating applied to the first surface of the transparent electrode layer. In another embodiment of the present invention, the light emitting particles may be dispersed throughout a dielectric layer of an inorganic electroluminescent device. In this embodiment the light emitting particles may also be phosphor particles and the phosphor particles may be encapsulated within a protective dielectric layer to prevent moisture from degrading the phosphor. Preferably, the transparent electrode layer of an inorganic electroluminescent device is comprised of indium tin oxide (ITO) or a zinc oxide:aluminum (ZnO:Al) composite; the phosphor may be zinc sulfide: manganese (ZnS:Mn); and the dielectric layer may be barium titanate ($BaTiO_3$).

In another embodiment of the present invention, the dielectric layer of the inorganic electroluminescent device is covered with a pressure-variable resistive layer, a flexible electrode covers the variable resistive layer and the second lead from the alternating current source is coupled to the flexible electrode. The variable resistive layer is comprised of conductive particles dispersed through a non-conducting compressible polymer. Where the ridges of a relief object contact the flexible electrode and generate localized pressure, a conductive path through the resistive layer is formed by bringing conductive particles into proximity with one another. Those areas of the flexible electrode proximate the valleys of the relief object do not generate significant localized pressure which compresses the conductive particles. Thus, the particles remain separated and less current is passed though those portions of the layer. Accordingly, the localized pressure caused by pressing the ridges of the relief object against the flexible electrode provide more current from the alternating current source to the transparent electrode through the dielectric and light emitting layers. Again, the magnitude of the current passing though the light emitting particles determines the intensity of the light for the optical image of the valleys and ridges of the relief object.

In this embodiment of the present invention, the relief object is not conducting current from the alternating current source to the dielectric layer. Instead, the relief object forms conductive paths in the variable resistive layer for current supplied from the flexible electrode. Thus, this embodiment insulates the relief object from the alternating current. This is especially advantageous for relief object imaging systems which are used in countries which have regulations regarding the amount of current to which a person can be exposed. Because pressure from the structure of the relief object generates the conductive paths through the variable resistive layer, excessive moisture or dryness does not degrade image contrast as happens in systems where a platen must be illuminated.

In another embodiment of the present invention, an organic electroluminescent device is used. The structure of the organic electroluminescent device may be comprised of a thin, sublimed molecular film such as tris (8-quinolinolato) aluminum (III), commonly denoted as Alq or a light-emitting polymer with specialized structures which provide positive and negative charge carriers having high mobility. Light-emitting polymers include poly(p-phenylene vinylene) or PPV, soluble polythiophene derivatives, and polyanilene which may be applied to the specialized structure by known coating techniques such as spin or doctor-blade coating.

Because organic electroluminescent devices operate at low voltages, the relatively high self-resistance of common relief objects do not effectively modulate the luminescence generated by the electroluminescent device. If the relief object to be imaged is not capable of withstanding a relatively large voltage drop at currents of at least a few milliamperes, an insulating layer is preferably provided between the relief object and the organic electroluminescent device. Preferably, the insulating layer is a pressure-variable resistive layer such as the one discussed above. The pressure-variable resistive layer selectively provides an electrical resistance which varies in correspondence with the ridges and valleys of the relief object contacting the resistive layer. As a result, the higher level currents may be presented through the lower resistance paths to the organic electroluminescent device to generate holes and electrons which recombine to produce localized photons. More preferably, the organic electroluminescent device is coated with a pixelated low work function metal such as calcium or aluminum to effect efficient electron charge injection. The embodiments of the present invention which utilize an organic electroluminescent device provide a relief object image generator which may be powered from a DC current source.

These and other advantages and benefits of the present invention may be ascertained from the detailed description of the invention presented below and the drawings discussed therein.

BRIEF DESCRIPTION OF THE DRAWINGS

The accompanying drawings, which are incorporated and constitute a part of the specification, illustrate preferred and alternative embodiments of the present invention and, together with a general description given above and the detailed description of the embodiments given below, serve to explain the principles of the present invention.

FIG. 1 depicts a relief object image generating system made in accordance with the principles of the invention which uses an inorganic electroluminescent device;

FIG. 1A depicts the electroluminescent device of FIG. 1 having a concave surface to facilitate placement of a rounded relief object;

FIG. 2 depicts an embodiment of the present invention that insulates the relief object from the current of the alternating current source in FIG. 1;

FIG. 3 depicts an embodiment of the present invention in which an organic electroluminescent device is used;

FIG. 4 is an embodiment of the present invention using a reduction lens and sensor array to provide an electrical data representation of a relief object image; and FIG. 5 depicts an embodiment of the present invention with a sensor array which is approximately the size of the electroluminescent device for use in thin profile applications.

DETAILED DESCRIPTION OF THE INVENTION

A system for imaging relief objects in accordance with the principles of the present invention is shown in FIG. 1. Image generator 10 includes a single electrode electroluminescent device 12 and an electrical current source 14. The electrical current source has a lead 16 which is coupled to electroluminescent device 12, and a second lead 18 for coupling current to a relief object when it is placed against or proximate to electroluminescent device 12. In response to the current coupled from the relief object to electroluminescent device 12, different areas of electroluminescent device 12 generate light at intensities which correspond to the amount of current coupled to an area of electroluminescent device 12. Electroluminescent device 12 may be constructed from known inorganic electroluminescent devices that include two planar electrodes which are mounted at opposite ends of the electroluminescent device so they cover the length and width of the device and are aligned with one another. This type of structure is used, for example, to provide a back-light for a liquid crystal display. By removing an electrode and coupling a current source to the relief object, the features of the relief object couple current differently to the electroluminescent device to selectively stimulate areas of the electroluminescent device and produce an image of the relief object. Electroluminescent device 12 is formed with a slightly concave surface (FIG. 1A) to facilitate placement of a rounded relief object, such as a fingertip, against device 12.

Electroluminescent device 12 may be an inorganic electroluminescent device or an organic electroluminescent device. Organic electroluminescent devices include thin sublimed molecular films such as tris(8-quinolinolato) aluminum (III) commonly known as Alq or light-emitting polymers having specialized structures which provide positive and negative charge carriers having high mobilities. The light-emitting polymers include poly(p-phenylene vinylene) or PPV, soluble polythiophene derivatives, and polyanilene which may be applied by known coating techniques such as spin or doctor-blade coating. Prototypes of these devices are manufactured and available from Uniax Corporation of Santa Barbara, Calif.

Electroluminescent device 12 in FIG. 1 is an inorganic electroluminescent device. Inorganic electroluminescent device 12 includes a transparent electrode 22, a light emitting layer 24, and a dielectric layer 26. Current source 16 is an alternating current (AC) source. Electrode 22, light emitting layer 24, and dielectric 26, are all preferably planar materials and are structured so that electrode layer 22 has a first surface 30 which lies along one surface of light emitting layer 24 and dielectric layer 26 has a first surface 34 which lies along the opposite planar surface of light emitting layer 24. Lead 22 from alternating current source 14 is coupled to transparent electrode 22 and lead 18 extends from alternating current source 14 to a relief object 20. One way to provide a second lead is to place a pad of insulating material (not shown) along one end of dielectric layer 26 that is exposed for contact with a relief object. The second lead may then be placed on top of the insulating layer so that a relief object brought in contact with the exposed area of dielectric layer 26 may also be coupled to alternating source 14. In this arrangement lead 18 may be fixed to the insulating pad located at one end of dielectric layer 26 so it is not easily moved to a position where alternating source 14 is short circuited.

Transparent electrode 22 is, preferably, a polymeric material coated with a transparent electrode composition such as indium tin oxide (ITO). Electrode 22 is transparent to permit light generated by light emitting layer 24 to pass through with little attenuation or modulation.

Light emitting layer 24 may be a coating of light emitting particles applied to the first surface of transparent electrode 22. The coating is preferably a phosphor material such as zinc sulfide:manganese (ZnS:Mn). Alternatively, light emitting particles may be dispersed in dielectric layer 26. In this embodiment, the light emitting layer is not a distinct layer interposed between the dielectric layer and transparent electrode but is suspended in the dielectric material, preferably in a uniform manner. For example, the phosphor material ZnS:Mn may be dispersed in an insulating dielectric material such as barium titanate ($BaTiO_3$). Although the material disclosed for transparent electrode 22, light emitting layer 24, and dielectric layer 26 are exemplary, they are not the only materials that may be used. For example, transparent electrode 22 may also be made from zinc oxide:aluminum (ZnO:Al) and other light emitting particles such as zinc silicate ($Zn_2SiO_4$) and zinc gallate ($ZnGa_2O_4$) may be used. The dielectric material may be from a variety of materials such as yttrium oxide, silicon nitride, or silicon oxy-nitride.

Alternating current source 14 may output a root-mean-square (RMS) voltage in the range fu of 20 to 300 volts having an output frequency in the range of approximately 50 to 2000 Hertz. To adequately drive 6.5 square centimeters (about one square inch) of the light emitting layer disclosed above, a current in the range of 100 to 500 microamperes is typically required. The light emitted by the phosphor and the materials disclosed above generates an emission spectra which is typically in the blue, blue-green, and green wavelengths. While the invention is discussed with reference to radiation being emitted in the visible light portion of the radiation spectrum, other materials emitting radiation in other portions of an emission spectra may be used and remain within the principles of the present invention.

One way to construct system 10 is to modify an electroluminescent (EL) lamp. These devices are well known and an exemplary EL lamp is that manufactured by Durel Corporation of Chandler, Ariz. and designated as part number DB5-615B. EL lamp structure differs from the structure shown in FIG. 1 in that the exposed surface 38 of dielectric layer 26 is bonded to an opaque electrode, such as aluminum, silver, or carbon. When an alternating current source is coupled to an EL lamp, the current passed from the opaque electrode to the transparent electrode excites the light emitting particles causing them to generate light. However, such a structure is inoperative to image relief objects as the opaque electrode provides a steady state flow of current across its area. The inventors of the present invention have modified the EL structure by removing the opaque electrode to expose dielectric layer 26. By providing the second lead from alternating source 14 at a insulated pad located at an end of dielectric layer 26, a relief object brought in contact with dielectric layer 26 may also be placed so it contacts lead 18. As a result, those portions of the relief object which directly contact dielectric layer 26 provide current at a magnitude different from the current provided at the portions of the relief object which are not in direct contact with dielectric layer 26. This modification of an EL lamp and the use of a modified EL lamp to image a relief object are previously unknown.

The dielectric layer/light emitting particles/transparent electrode structure may be electrically modeled as a capacitor in parallel with a resistor. In the materials preferably used to construct the present invention, the capacitance of this structure is in the range of 2 to 6 nFarads per 6.5 square centimeters (about one square inch) and the resistance is in the range of 50 to 1,500 KΩ per 6.5 square centimeters (about one square inch). The amplitude of the output voltage of alternating current source 14 may be adjusted to alter the intensity of the emitted light which corresponds to the ridges of the relief object. Current sensing or current limiting circuits may be coupled to the second lead from alternating current source 14 to ensure the current provided to a relief object adheres to international regulatory limits for applications where the relief object is a portion of a person.

An embodiment which may be used without a current limiting or sensing circuit is shown in FIG. 2. Using like numerals for like structure, system 40 includes transparent electrode 22, light emitting layer 24, and dielectric layer 26. The various materials and structure discussed above with the embodiment of FIG. 1 are likewise applicable for the embodiment shown in FIG. 2. In addition to these elements, system 40 includes a variable resistive layer 44 and a flexible electrode 46 to which the second lead from alternating current source 14 is coupled. The first lead 16 from alternating source 14 is coupled to transparent electrode 22 as discussed above.

Variable resistive layer 44 is comprised of a non-conducting, compressible polymeric material in which conductive particles are suffused. The conductive particles are distributed throughout the polymeric material and are separated from one another by a distance which is slightly larger than the diameters of the particles. The conductive particles may be low density polymeric or ceramic spheres coated with a metallic layer. Magnetic particles may also be added to the composition of the variable resistive layer to improve electrical conductivity. By varying the number of conductive particles pet unit volume, the size of the particles, the conductive properties of the particles, the bulk material modulus of the polymeric material, and other known factors, the resistance of a conductive path from one surface of variable resistance layer 44 to the opposite surface as a function of pressure applied to the first surface may be designed to vary over a wide range. Where the particle sizes are small and the thickness of the polymeric material is thin, high spatial resolution of localized pressure is possible. Preferably, the diameters of the conductive particles and non-conductive metric polymers should be smaller than the smallest resolution element desired for the image. The thickness of variable resistance layer 44 should approximate the same resolution element size. Preferably, the thickness of the variable resistance layer is in the range of 50–100 micrometers. Variable resistive layers which may be used in the embodiment shown in FIG. 2 are disclosed in U.S. Pat. Nos. 5,209,967 and 4,624,798. Preferably, flexible electrode 46 is made of a thin polymer such as polypropylene or polyester that is less than 25 micrometers in thickness and having a very thin sputtered metallic coating.

When a relief object 20 is brought in contact with flexible electrode 46, those portions of the relief object which directly contact flexible electrode 46, i.e., ridges 50, locally compress resistive layer 44 to form a conductive path to dielectric layer 26. This conductive path allows current to move from flexible electrode 46 through resistive layer 44, dielectric layer 26 and light emitting layer 24 to transparent electrode 22. This current flow excites the light emitting particles in the flow path so the particles emit light at an intensity that corresponds to the magnitude of the current. As the pressure in the areas adjacent valleys 52 of relief object 20 do not compress those areas of resistive layer 44 as tightly as those areas adjacent ridges 50, the conductive paths in the areas adjacent valleys 52 have electrical resistance that is greater than those areas adjacent ridges 50. Consequently, the light emitting particles aligned with the relatively uncompressed areas of resistive layer 44 emit light having an intensity that is less than that generated by the more tightly compressed areas. Accordingly, an optical image of the relief object is generated where light is more intense at the areas corresponding to the ridges of the relief object and less intense at the areas where there are valleys in the relief object.

Flexible electrode 46 and resistive layer 44 provide a pressure-to-optical conversion of the relief features of the relief object. As a result, the light absorbing and reflective properties of the relief object do not affect the image generated by the embodiment shown in FIG. 2. Furthermore, flexible electrode 46 isolates the relief object from the current output by alternating current source 14. As the electrical coupling mechanism from the relief object to electrode 46 and resistive layer at 44 to dielectric layer 26 is primarily resistive, altering the amplitude of the output voltage still adjusts the intensity of the light emitted from the light emitting particles receiving current from flexible electrode 46.

An embodiment of the present invention which utilizes an organic elecroluminescent device is shown in FIG. 3. The electorluminescent device 60 includes and anode 62, an organic layer 64, and a pixilated, low work function metalization layer 66. Preferably, anode 62 is transparent and may be formed by coating a base substrate of glass or plastic 63 with indium tin oxide (ITO). Organic layer 64 is formed by depositing a thin film layer such as polyaniline over the ITO and then an electroluminescent polymer such as poly (2-methoxy-5-(2"-ethylhexyloyx)-1, 4phenylene vinylene), also commonly known as MEH-PEV, is deposited over the polyanilene. A metal, such as calcium or aluminum, is deposited over organic layer 64 to form pixilated, low work function metalization layer 66. Preferably current source 14 is a direct current (DC) source which outputs a voltage of approximately 40 milliamperes.

If the relief object to be imaged is capable of absorbing relatively high voltage drops at current levels of a few milliamperes, then the relief object may be brought in contact with a lead from current source 64 and placed against electroluminescent device 60 for imaging. Where limitations to the current magnitude that can be brought in contact with a relief object are important, such as current limitations for a person, a pressure-variable resistive layer is interposed between the relief object and the organic layer. The pressure from the ridges of the relief object generate a lower resistance path through the resistive layer than the pressure from the valleys of the relief object. The current from the current source is then coupled at different magnitudes to the electroluminescent device. The number of holes and electrons generated by an area of the electroluminescent layer is proportional to the magnitude of current coupled to the area. The recombination of these holes and electrons generates photons with the intensity of the resulting light being dependent upon the number of holes and electrons generated in an area. Use of a pixelated low work function metallic layer, such as aluminum or calcium, defines discrete areas for coupling current from a resistive layer to anode 62. The variable resistance layer electrically isolates the relief object from the current source to reduce the current magnitude to which a relief object may be exposed.

As shown in FIG. 4, system 10 is aligned with a reduction lens 70 and an integrated circuit sensor array 72. Reduction lens 70 and integrated circuit sensor array 72 are well known in the art and are typically used with the relief object image generators that require a separate, indirect light source. This embodiment reduces the size of the generated image so the sensor array may be a smaller, and hence, more economical size. Still, this embodiment requires the distance from the relief object to the sensor array 72 to be several times the focal length of the reduction lens 70.

In applications where a thin profile is required, such as cellular phones, portable computers and the like, reduction lens 70 may be eliminated and a sensor array 78 placed along the exposed surface of transparent electrode 22 as shown in FIG. 5. Sensor array 78 is typically not of the conventional integrated circuit type to reduce cost. Instead, sensor array 78 may utilize low cost processes such as those developed in the display industry. Such exemplary processes include amorphous silicon on glass and low temperature polysilicon on glass. The signals from these sensor arrays may then be provided to a computer for further optical processing.

In operation, an electroluminescent device having a single, transparent electrode is coupled to a current source so that one lead from the current source is coupled to the transparent electrode and a second lead from the current source is left exposed near an exposed surface of the electroluminescent device. Preferably, the second lead is fixed to an insulator mounted at one end of the exposed surface of the electroluminescent device. A relief object is brought into contact with the exposed surface of the electroluminescent device and also coupled to the second lead of the current source. The current through the relief object is coupled, either strongly at the ridge contacts or weakly at the valleys, to the electroluminescent device. Those light emitting particles aligned with the ridges of the relief object cause the electroluminescent device to generate light at an intensity greater than those light emitting particles aligned with the valleys of the relief object. The difference in the intensity in the light generated by these particles forms an optical image of the relief object.

In the alternative embodiment of the present invention, a variable resistance layer covers the exposed surface of the electroluminescent device and a flexible electrode is provided over one surface of the variable resistive layer. The first lead of the current source is coupled to the transparent electrode and the second lead is coupled to the flexible electrode. When a relief object is pressed against the flexible electrode, localized pressure corresponding to the ridges of the relief object compresses a portion of the resistive layer to form a conductive path having less electrical resistance than the portions of the resistive layer proximate the valleys of the relief object. As a result, currents through the conductive paths corresponding to the ridges have magnitudes that are greater than those through the conductive paths corresponding to the valleys. The higher magnitude currents coupled to the electroluminescent device generate light at an intensity greater than those portions of the electroluminescent device coupled to the currents corresponding to the valleys. The light generated by the electroluminescent device forms an optical image of the relief object where light areas correspond to the ridges of the relief object and darker areas correspond to the valleys of the relief object. The optical images of both embodiments may be focused by a reduction lens and sensed by an integrated circuit sensor array or provided to a one-to-one sensor array for conversion to electrical signals.

While the present invention has been illustrated by the description of two embodiments and while the embodiments have been described in considerable detail, it is not the intention of the applicant to restrict or anyway limit the scope of the appended claims to such detail. Additional advantages and modifications will readily appear to those skilled in the art. The invention's broader aspects are therefore not limited to the specific details, representative apparatus and method, or illustrative examples shown and described. Accordingly, departures may be made from such details without departing from the spirit or scope of applicant's general inventive concepts.

What is claimed is:

1. A system for generating an image of relief object comprising:

an electroluminescent device coupled to an electrode;

a variable resistive layer adjacent to one surface of said electroluminescent device, said variable resistive layer being comprised of conductive particles dispersed through a non-conductive medium, wherein said conducting particles are smaller than the resolution element desired for image;

a flexible electrode substantially covering a surface of said variable resistive layer;

an electrical current source, said electrical current source having one lead coupled to said electrode of said electroluminescent device and a second lead for coupling to said flexible electrode so that current coupled from said current source to said flexible electrode is strongly coupled through a low resistance path through said variable resistive layer to said electroluminescent device by ridges of said relief object and weakly coupled through a high resistance path through said variable resistive layer to said electroluminescent device by valleys of said relief object whereby more intense light is generated by areas of said electroluminescent device strongly coupled to said current from said ridges of said relief object and less intense light is generated by areas of said electroluminescent device weakly coupled to said current from valleys of said relief object to form an image of the relief object; and wherein said image is a detailed image of a finger print that could be used for identification.

2. The system of claim 1, wherein said electroluminescent device is an organic electroluminescent device.

3. The device of claim 2, said organic electroluminescent device further comprising:

a thin, sublimed molecular film; and said electrode being a transport anode on which said thin, sublimed molecular film is deposited and to which said one lead of said electrical current source is coupled.

4. The device of claim 3, said thin, sublimed molecular film being tris(8-quinolinolato) aluminum (III).

5. The device of claim 2, said organic electroluminescent device further comprising:

a light emitting polymer; and said electrode being a transparent anode on which said light emitting polymer is deposited and to which said one lead of said electrical current source is coupled.

6. The device of claim 5, said tight emitting polymer being of the group of poly(p-phenylene vinylene), soluble polythiophene derivatives, or polyanilene.

7. The devices of claim 5, said transparent anode being comprised of a transparent base substrate coated with indium tin oxide.

8. The device of claim 5, said current source being a direct current source having one lead coupled to said transparent anode of said organic device and a second lead exposed at a surface of said flexible electrode so that a localized pressure gradient generated by a portion of a relief object contacting said flexible electrode forms a conductive path through said variable resistive layer which corresponds to said localized pressure gradient whereby said current flows from said direct current source and flexible electrode through said variable resistive layer to said transparent anode of said organic electroluminescent device in correspondence with said localized pressure gradient to generate a light image of said relief object.

9. The system of claim 1, wherein said electroluminescent device is an inorganic electroluminescent device.

10. The system of claim 9 said inorganic electroluminescent device further comprising:

a transparent electrode layer;

a dielectric layer;

a light emitting layer containing light emitting particles, said light emitting layer being interposed between said transparent electrode and said dielectric layer so that a first surface of said transparent electrode and a first surface of said dielectric layer are proximate said light emitting layer; and said current supply source is an alternating current source.

11. The system of claim 1, further comprising:

a sensor array; and optical elements interposed between said sensor array and said electroluminescent device, said optical elements for focusing said generated light on said sensor array.

12. The system of claim 11, wherein said sensor array is an integrated circuit.

13. The system of claim 1, further comprising:

a one-to-one sensor array located proximate said electroluminescent device so that said generated light is sensed by said one-to-one sensor array.

14. The system of claim 13, wherein said one-to-one sensor array is amorphous silicon on glass.

15. The system of claim 1, wherein said conducting particles vary in size from 50 to 100 micrometers.

16. The system of claim 1 wherein a thickness of said variable resistive layer can be from 50 to 100 micrometers.

17. A device for generating an image of a relief object comprising:

a flexible electrode;

a dielectric layer;

a variable resistive layer between said flexible electrode and said dielectric layer, said variable resistive layer being comprised of conductive particles dispersed through a non-conductive medium wherein said conducting particles are smaller than the resolution element desired for image;

a second electrode;

a light emitting layer being interposed between said dielectric layer and said second electrode, said light emitting layer containing light emitting particles; and an electrical current source having first and second leads, said first lead of said electrical current source being coupled to said second electrode and said second lead of said electrical current source being coupled to said flexible electrode so that a localized pressure gradient generated by a portion of a relief object contacting said flexible electrode forms a conductive path through said variable resistive layer which corresponds to said localized pressure gradient whereby said current flows from said flexible electrode through said variable resistive layer, dielectric layer and light emitting particles to said second electrode in correspondence with said localized pressure gradient to generate a light image of said relief object; and wherein said image is a detailed image of a finger print that could be used for identification.

18. The device of claim 17, wherein said conducting particles vary in size from 50 to 100 micrometers.

19. The device of claim 17 wherein a thickness of said variable resistive layer can be from 50 to 100 micrometer.

20. A device for generating an image of a relief object comprising:

a flexible electrode;

a dielectric layer and a light emitting layer in which light emitting particles are dispersed;

a variable resistive layer between said flexible electrode and said dielectric layer, said variable resistive layer being comprised of conductive particles dispersed through a non-conductive medium wherein said conducting particles are smaller than the resolution element desired for image;

a second electrode; and an electrical current source having first and second leads, said first lead of said electrical current source being coupled to said second electrode and said second lead of said electrical current source being coupled to said flexible electrode so that a localized pressure gradient generated by portion of a relief object contacting said flexible electrode forms a conductive path through said variable resistive layer which corresponds to said localized pressure gradient whereby said current flows from said flexible electrode through said variable resistive layer, dielectric layer and light emitting particles to said electrode in correspondence with said localized pressure gradient to generate a light image of said relief object and wherein the relief object has valleys and ridges similar in size and structure to a finger and said image is a detailed image of the relief object that could be used for identification.

21. The device of claim 20, wherein said conducting particles vary in size from 50 to 100 micrometers.

22. The device of claim 20, wherein said relief object is a finger.

23. The device of claim 20, wherein a thickness of said variable resistance layer can be from 50 to 100 micrometers.

24. A system for generating an image of a relief object comprising:

an electroluminescent device having an electrode and configured as an organic electroluminescent device;

a variable resistive layer being proximate to said electroluminescent device, said variable resistive layer being comprised of conductive particles dispersed through a non-conductive medium wherein said conductive particles are smaller than the resolution element desired for image;

a flexible electrode that substantially covers a surface of said variable resistive layer; and said electrical current source being a direct current source having one lead coupled to said electrode of said organic device and a second lead exposed at a surface of said flexible electrode so that a localized pressure gradient generated by a portion of a relief object contacting said flexible electrode forms a conductive path through said variable resistive layer which corresponds to said localized pressure gradient whereby said current flows from said direct current source and flexible electrode through which said variable resistive layer to said electrode of said organic electroluminescent device in correspondence with said localized pressure gradient to generate a light image of said relief object and wherein the relief object has valleys and ridges similar in size and structure to a finger and said image is a detailed image of the relief object that could be used for identification.

25. The system of claim 24, wherein said relief object is a finger.

26. The system of claim 24, wherein said conductive particles vary in size from 50 to 100 micrometers.

27. The system of claim 24, wherein a thickness of said variable resistance layer can be from 50 to 100 micrometers.

28. A method for imaging a relief object comprising the steps of:

coupling an electrode of an electroluminescent device to a current source;

locating a variable resistive layer adjacent a dielectric layer of said electroluminescent device wherein thickness of said variable resistive layer is smaller than the resolution element desired for image;

substantially covering said variable resistive layer with a flexible electrode;

coupling said current source to said flexible electrode so that said contacting step contacts a relief object contacts said flexible electrode so that pressure from ridges and valleys of said relief object generate relatively low and high resistance conductive paths through said variable resistive layer whereby said current from said current source is provided through said variable resistive layer at different magnitudes corresponding to said ridges and valleys of said relief object and said different currents cause said electroluminescent device to generate said image of said relief object;

generating a detailed image of the relief object that has ridges and valleys similar to a finger; and using said detailed image for identification.

29. The method of claim 28, wherein said relief object is a finger.

30. The method of claim 28, wherein a thickness of said variable resistive layer can be from 50 to 100 micrometers.

31. The method of claim 28, wherein said conducting particles vary in size from 50 to 100 micrometers.

* * * * *